United States Patent [19]

Weaver et al.

[11] Patent Number: 4,950,732

[45] Date of Patent: Aug. 21, 1990

[54] CONDENSATION COPOLYMERS CONTAINING BIS-METHINE MOIETIES AND PRODUCTS THEREFROM

[75] Inventors: Max A. Weaver; Clarence A. Coates, Jr.; Wayne P. Pruett, all of Kingsport; Samuel D. Hilbert, Jonesborough, all of Tenn.

[73] Assignee: Eastman Kodak Company

[21] Appl. No.: 125,031

[22] Filed: Nov. 24, 1987

Related U.S. Application Data

[63] Continuation-in-part of Ser. No. 947,135, Dec. 29, 1986, abandoned.

[51] Int. Cl.$^5$ .................. C08G 63/44; C08G 63/76; C08G 69/44
[52] U.S. Cl. .................. 528/288; 528/290; 528/291; 528/292; 528/295; 528/293; 528/294; 528/302; 528/303; 528/304; 525/46; 525/445
[58] Field of Search ............ 528/388, 291, 292, 290, 528/295, 293, 294, 302, 303, 304; 525/46, 445

[56] References Cited

U.S. PATENT DOCUMENTS

| | | | |
|---|---|---|---|
| 3,634,320 | 1/1972 | Metaner et al. | 368/45.85 |
| 3,706,700 | 12/1972 | Kirchmayr et al. | 106/178 |
| 4,092,162 | 5/1978 | Wright et al. | 528/292 |
| 4,305,719 | 12/1981 | Zannucci et al. | |
| 4,340,718 | 7/1982 | Zannucci et al. | 528/128 |
| 4,617,374 | 10/1986 | Pruett et al. | 528/288 |
| 4,707,537 | 11/1987 | Pruett et al. | 528/288 |
| 4,749,772 | 6/1988 | Weaver et al. | 528/288 |
| 4,749,773 | 6/1988 | Weaver et al. | 528/288 |
| 4,749,774 | 6/1988 | Weaver et al. | 528/288 |

FOREIGN PATENT DOCUMENTS 142336 8/1983 Japan .................. 528/292

*Primary Examiner*—John Kight
*Assistant Examiner*—Dennis R. Daley

[57] ABSTRACT

A composition useful for molding into articles such as food containers, soft drink bottles, cured structural plastics and the like, comprising molding or fiber grade linear or unsaturated polyester or polycarbonate having copolymerized therein a total of from 1.0 to about 5,000 ppm, of the reactant residue moieties of one or a mixture of bis-methine reactants of the formula

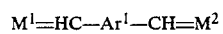

wherein
$Ar^1$ is an unsubstituted or substituted 1,4-phenylene radical; and
$M^1$ and $M^2$ are the same or different and each is a disubstituted methylene group having the structure

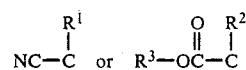

wherein
$R^1$ is

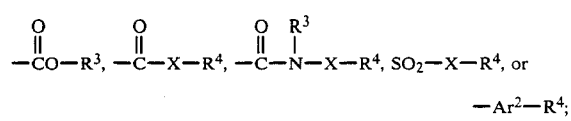

and
$R^2$ is

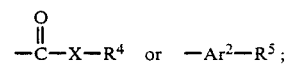

wherein
$R^3$ is hydrogen, allyl or an unsubstituted or substituted alkyl, cycloalkyl or phenyl radical;
X is a divalent alkylene, cycloalkylene or phenylene radical or a combination thereof which may include within the divalent chain one or two atoms or radicals selected from

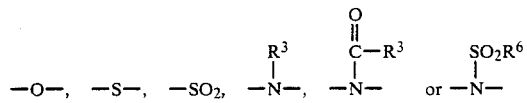

wherein
$R^6$ is an unsubstituted or substituted alkyl, cycloalkyl or phenyl radical;
$R^4$ is a group that is reactive with one of the monomers from which the condensation polymer is prepared;
$Ar^2$ is an unsubstituted or substituted phenylene or heterocyclic arylene radical;
$R^5$ is hydrogen, $R^4$ or $-X-R^4$;
wherein the bis-methine moiety absorbs radiation significantly in the range of 250 to 390 nm and is non-extractable from said polymer and is stable under the conditions the polymer is prepared or processed.

19 Claims, No Drawings

CONDENSATION COPOLYMERS CONTAINING BIS-METHINE MOIETIES AND PRODUCTS THEREFROM

This application is a continuation-in-part of out copending application Ser. No. 947,135 filed Dec. 29, 1986 now abandoned.

TECHNICAL FIELD

This invention concerns condensation polymers including linear polyester, unsaturated polyester, and polycarbonate types, wherein certain bis-methine moieties have been copolymerized (condensed) into the polymer to impart UV screening thereto. The bis-methine moieties are thermally stable and nonsublimable at the polymer processing (includes preparation) temperatures, are nonextractable therefrom, do not discolor the polymer, and absorb radiation over the entire harmful wavelength, thus rendering the polymers particularly suitable for use as beverage bottles and food, pharmaceutical and cosmetic containers. The bis-methine moieties are useful in total concentrations (of single moiety or mixtures thereof), given herein in parts per million (ppm), rangine from about 1.0 to about 10,000 preferably 2.0 to about 1,500 ppm, and most preferably from about 100 to about 800 ppm (parts by weight of moiety per million parts by weight of final polymer).

BACKGROUND ART

Heretofore, various UV absorbers such as the benzophenones, benzotriazoles and resorcinol monobenzoates have been incorporated into polymers as discussed in Plastics Additives Handbook, Hanser Publishers, Library of Congress Catalog No. 83-062289, pp. 128–134, for use in absorbing or screening deleterious radiation. The additives function well to screen radiation in the range of from about 300 to about 350 nm, however, this range is not adequate to protect the contents of food packaging employing these polymers. Moreover, these compounds when added to polyesters are extractable by solvents which may be present in food packaged with the polymers. Such solvents would include typical food acids, alcohols and the like. Furthermore, these compounds are not in general stable under the polyester manufacturing and processing conditions and produce objectionable yellow shades in food packaging. Also, the various copolyesters such as disclosed in U.S. Pat. No. 4,338,247, while having essentially nonextractable UV absorbers, are not suitable for food packaging in that the abosrbers transmit harmful radiation and are not designed to protect food.

U.S. Pat. No. 3,634,320 discloses compounds somewhat similar to applicant's for mixing into various polymers for U.V. absorption, however, copolymerization is not involved and the λ max values for the compounds are not sufficiently high to protect food. It is noted that the polyfunctional compounds of the patent would act as cross-linking agents in any attempted copolymerization.

DISCLOSURE OF INVENTION

The present linear polymers are thermoplastic molding or fiber grade having an I.V. of from about 0.4 to about 1.2, and preferably are polyesters wherein the acid moiety is comprised of at least about 50 mol % terephtghalic acid residue, and the glycol moiety at least about 50 mol % ethylene glycol or 1,4-cyclohexanedimethanol residue, and containing a total of from about 1 to about 10,000 ppm of one or a mixture of the bis-methine moieties. The term "acid" as used herein with respect to both the linear and unsaturated polyesters includes their various reactive derivatives such as dimethylterephthalate, anhydrides and the like. A highly preferred polyester within this preferred group is comprised of from about 75 to 100 mol % terephthalic acid residue and from about 75 to 100 mol % ethylene glycol residue.

In accordance with the present invention, the bis-methine moieties derived from the reactants shown below impart to the polymers the property of ultraviolet absorption generally significantly within the range of from about 250 nm to about 390 nm, and have their maximum absorbancies in the 340–375 nm range. The moieties preferably have molecular weights of from about 280 to about 400 although lower or higher molecular weights are also operable and are derived from reactants (monomers) having one or more groups which condense during condensation or polycondensation to enter the moiety into the polymer chain. These groups include hydroxyl, carboxyl, carboxylic ester, acid halide and the like. As aforesaid, these moieties are thermally stable at polymer processing conditions, which includes polycondensation temperatures of up to about 300° C. which are used, for example, in the preparation of polyesters such as poly(ethylene terephthalate) and copolymers of terephthalic acid, ethylene glycol, and 1,4-cyclohexanedimethanol.

It is particularly noted that when the levels of the present ultra-violet light absorbers are increased to higher levels such as 5,000 ppm or higher, polymers containing these ultra-violet light absorbers show improved resistance to weathering and when these polymers per se or fibers thereof are dyed with disperse dyes, at a concentration, for example, of from about 0.01 to about 5.0% based on weight of polymer or fiber, many dyes exhibit increased light-fastness. Such disperse dyes are shown, for example, in U.S. Pat. No.s 4,305,719; 2,746,952; 2,746,953; 2,757,173; 2,763,668; 2,771,466; 2,773,054; 2,777,863; 2,785,157; 2,790,791; 2,798,081; 2,805,218, 2,822,359; 2,827,450; 2,832,761; 2,852,504; 2,857,371; 2,865,909; 2,871,231; 3,072,683; 3,079,373; 3,079,375; 3,087,773; 3,096,318; 3,096,322; 3,236,843; 3,254,073; 3,349,075; 3,380,990; 3,386,990; 3,394,144; 3,804,823; 3,816,388; 3,816,392; 3,829,410; 3,917,604; 3,928,311; 3,980,626; 3,998,801; 4,039,522; 4,052,379; and 4,140,683, the disclosures of which are incorporated herein by reference.

The present invention is deified in its broad embodiment as a composition comprising molding or fiber grade condensation polymer having copolymerized therein a total of from 1.0 to about 10,000 ppm, of the reactant residue moieties of one or a mixture of bis-methine reactants of the formula $$M^1=HC-Ar^1-Ch=M^2$$

wherein
Ar¹ is an unsubstituted or substituted 1,4-phenylene radical; and
M¹ and M² are the same or different and each is a disubstituted methylene group having the structure

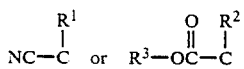

wherein
R¹ is

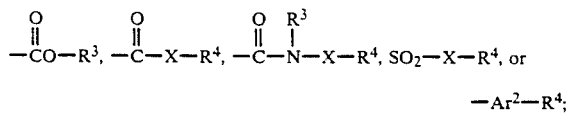

and
R² is

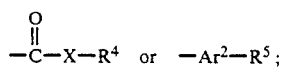

wherein
R³ is hydrogen, allyl or an unsubstituted or substituted alkyl, cycloalkyl or phenyl radical;
X is a divalent alkylene, cycloalkylene or phenylene radical or a combination thereof which may include within the divalent chain one or two atoms or radicals selected from

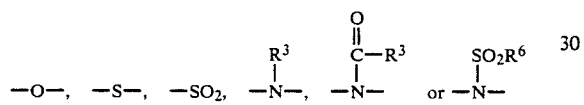

wherein
R⁶ is an unsubstituted or substituted alkyl, cycloalkyl or phenyl radical;
R⁴ is a group that is reactive with one of the monomers from which the condensation polymer is prepared;
Ar² is an unsubstituted or substituted phenylene or heterocyclic arylene radical;
R⁵ is hydrogen, R⁴ or —X—R⁴;
wherein the bis-methine moiety absorbs radiation significantly in the range of 250 to 390 nm and is non-extractable from said polymer and is stable under the conditions the polymer is prepared or processed.

The 1,4-phenylene radical represented by Ar¹, the phenylene radical which Ar² and X can represent, the phenyl radical which R³ can represent and the heterocyclic arylene radical which Ar² can represent may be substituted with up to four substituents selected from lower alkyl or halogen. As used herein to describe an alkyl or an alkyl moiety-containing group, "lower" designates a carbon content of up to 4 carbon atoms.

The alkyl radicals represented by R³ and R⁶ may contain from 1 to 8 carbon atoms and may be substituted with one or more substituents such as hydroxyl, lower alkoxy, lower hydroxyalkoxy, lower alkanoyloxy, lower alkanoylamino, cyano, halogen, cycloalkyl, furyl, tetrahydrofuryl, lower alkoxycarbonyl, lower alkylsulfonyl, carbamoyl, N-alkylcarbamoyl, N,N-dialkylcarbamoyl, phenyl, lower alkylphenyl, lower alkoxycarbonylphenyl, halophenyl and the like. The alkyl groups represented by R³ and R⁶ preferably are unsubstituted lower alkyl.

The cycloalkyl groups which R³ and R⁶ can represent preferably are cycloalkyl of 5 to 7 carbon atoms such as cyclopentyl, cycloheptyl and, especially, cyclohexyl. Such cycloalkyl groups may be substituted with up to four substituents such as lower alkyl, lower alkoxy, halogen, lower hydroxyalkyl, alkyl, lower alkoxycarbonyl and the like. The phenyl radicals which R³ and R⁶ can represent likewise may be substituted with the substituents which may be present on the substituted alkyl and cycloalkyl radicals described hereinabove.

The divalent group represented by X may be selected from a wide variety of alkylene, cycloalkylene and phenylene radicals or combinations thereof containing a total of up to 12 carbon atoms. The alkylene groups may contain up to 8 carbons atoms and may contain within their chain hereto atoms such as oxygen, sulfur and nitrogen and/or cyclic groups such as cycloalkylene or phenylene radicals. Example of the group represented by X include alkylene, alkylene-O-alkylene, alkylene-SO₂-alkylene, alkylene-S-alkylene,

alkylene-O-alkylene-O-alkylene,

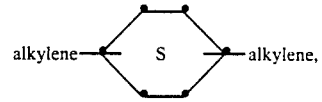

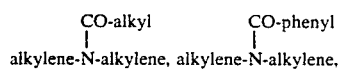

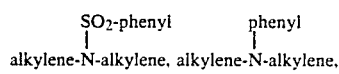

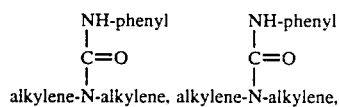

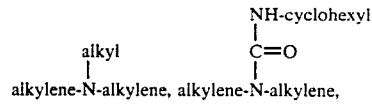

or cyclohexylene. The divalent group represented by X preferably is alkylene of 1 to 4 carbon atoms, cyclohexylene or phenylene.

The reactive group represented by R⁴ may be hydroxy, an ester group such as

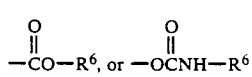

wherein R⁶ is defined hereinabove, carboxy, carbonyl halide such as carbonyl chloride or amino. Such reactive groups represented by R⁴ may be attached directly to divalent radical X or indirectly through various bridging groups, e.g., hydroxyalkoxyalkyl, hydroxyalkyl, hydroxyalkoxy, acetoxyaloxy, hydroxyalkylthio, N-hydroxyalkylsulfamoyl, N-(alkoxycarbonylphenyl)-sulfamoyl, N-[(hydroxyalkoxy)alkyl]carbamoyl, etc. It is apparent that the ester groups

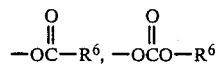

and

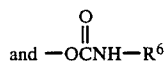

and the substituents represented by $R^3$ and $R^6$ in the groups

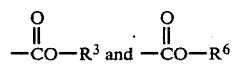

are displaced or removed from the bis-methine compounds upon reaction with the polymer or polymer precursor. Thus, those residues are not an important part of the bis-methine residue component of our novel compounds.

The heterocyclic arylene groups represented by $Ar^2$ may be substituted with one or more lower alkyl or halogen substituents in addition to being substituted with a reactive $R^4$ substituent. The heterocyclic group may be selected from one of the groups having the structure

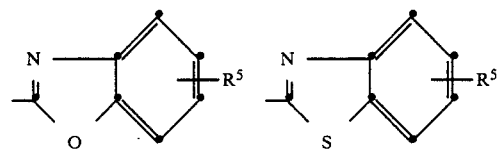

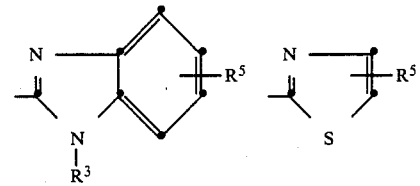

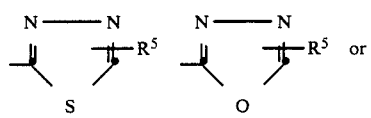

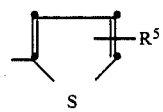

which, as mentioned above, may be also substituted with lower alkyl, alkoxy and/or halogen.

Of particular interest are condensation polymers containing the residue of a bis-methine compound having the formula

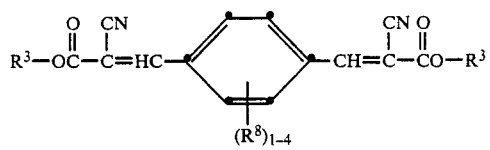

wherein $R^3$ is defined above and $R^8$ is hydrogen, alkyl or halogen. Compounds in which $R^8$ is hydrogen and $R^3$ is alkyl of 1 to 6 carbon atoms are particularly preferred.

A second group of preferred compounds have the formula

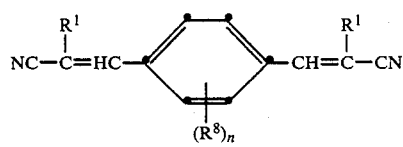

wherein $R^1$ is lower alkoxycarbonylphenyl, lower alkoxycarbonylbenzoyl, lower alkoxycarbonyl-2-benzoxazolyl, lower alkoxycarbonyl-2-benzothiazolyl, lower alkoxycarbonyl-2-benzimidazolyl, N-lower hydroxyalkylcarbamoyl or N-lower alkanoyloxy-loweralkylcarbamoyl;

$R^8$ is lower alkyl, halogen or, most preferably, hydrogen; and n is 1 or 2.

A third group of preferred compounds have the formula

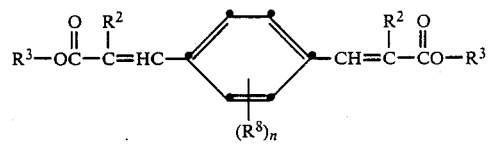

wherein $R^3$ is lower alkyl;

$R^2$ is benzoyl, 2-benzoxcazolyl, 2-benzothiazolyl or 2-benzimidazxolyl;

$R^8$ is lower alkyl, halogen or, most preferably, hydrogen; and n is 1 or 2.

The bis-methine compounds used in the preparation of the novel polymer compositions provided by this invention may be prepared by the Knoevenagel reaction whereby a bis-aldehyde is condensed with an active methylene compound in the presence of a base such as piperidine or sodium acetate as shown by the following reaction schemes:

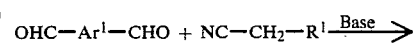

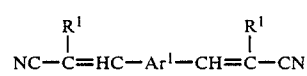

-continued

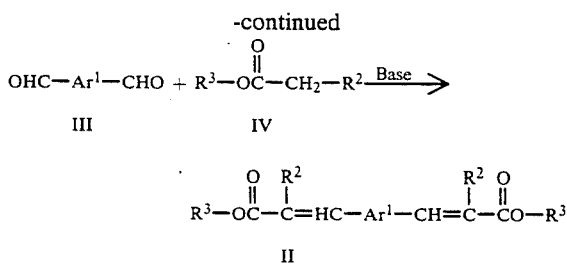

$$R^3-OC-C=HC-Ar^1-CH=C-CO-R^3$$
(with O double bonds and R² substituents)

II

Typical aldehydes III are terephthalaldehyde, 2-chloroterephthalaldehyde, 2,3-dichloroterephthalaldehyde, 2-fluoroterephthalaldehyde, 2-methylterephthalaldehyde, 2,5-dichloroterephthalaldehyde, 2,5-dimethylterephthalaldehyde, and tetramethyl terephthalaldehyde. Suitable cyanoacetic acid esters are, for example, methyl cyanoacetate, ethyl cyanoacetate, isopropyl cyanoacetate, n-butyl cyanoacetate, cyclohexyl cyanoacetate, benzyl cyanoacetate, phenyl cyanoacetate, 2-hydroxyethyl cyanoacetate, 2-methoxyethyl cyanoacetate, 2-chloroethyl cyanoacetate, n-hexyl cyanoacetate, sec-butyl cyanoacetate, tert-butyl cyanoacetate, methyl 4-(cyanomethyl)benzoate, ethyl 2-benzoxazolyl)acetate, ethyl 2-benzoylacetate, etc.

The nonextractabilities of the present bis-methine moieties are determined as follows:

EXTRACTION PROCEDURE

All extractions are done in glass containers with distilled solvents under the time and temperature conditions described below. The sample form is ½ inch×2½ inch segments cut from the cylindrical side wall portion of 2-liter bottles. All samples are washed with cold solvent to remove surface contaminants and are exposed using 200 ml. solvent/100 in.² surface area (2 ml/in.²).

Solvent blanks ae run under the same extraction conditions without polymer. In most cases samples were extracted, spiked, with a known amount of additive as a control, and analyzed in duplicates.

EXTRACTION CONDITIONS

1. Water. The samples at room temperature are added to solvent and heated at 250° F. for two hours. Half of the samples are then analyzed and the remainder are placed in a 120° F. oven for 30 days.

2. 50% Ethanol/Water. The samples at room temperatures are added to the solvent at room temperature, placed in an oven at 120° F. and analyzed after 24 hours and 30 days.

3. Heptane. The samples at room temperature are added to solvent at room temperature and heated at 150° F. for two hours. Part of the samples are cooled to room temperature and analyzed spectrophotometrically and the remainder are allowed to age at 120° F. for 30 days before analysis.

4. Any suitable analytical technique and apparatus may be employed to determine the amount of bis-methine moiety extracted from the polymer.

The extractability of the present bis-methine moieties from the present polymers was found to be essentially nonexistent.

Polyesters useful in this invention include linear, thermoplastic, crystalline, or amorphous materials, produced by conventional techniques using one or more diols and one or moe dicarboxylic acids, copolymerized with the bis-methine moieties.

Also useful are the unsaturated, curable polyesters which are the polyesterification products of one or more dihydric alcohols and one or more unsaturated dicarboxylic acids or their anydridies, and the term "polyester resin" is used herein to define the unsaturated polyester dissolved in or admixed with an ethylenically unsaturated monomer. Typical of the unsaturated polyesters is the polyesterification product of (a) 1,4-cyclohexanedimethonal and/or 2,2-dimethyl-1,3-propanediol and optionally and additional dihydric alcohol, such as ethylene glycol, and (b) maleic acid or fumaric acid and an unsaturated hydrogenated aromatic dicarboxylic acid, which when crosslinked with an ethylenically-unsaturated monomer, e.g., styrene, produces a cured polyester resin which has, for example, high thermal resistance, high heat distortion values, excellent electrical and mechanical properties, and excellent resistance to chemicals.

The unsaturated polyester resins may be prepared in the presence of gelation inhibitors such as hydroquinone or the like, which are well known in the art of polyesterification. The esterification may be carried out for example under an inert blanket of gas such as nitrogen in a temperature range of 118°–220° C. for a period of about 6–20 hours until an acid number below 100 and preferably below 50 is obtained, based on milliequivalents of KOH necessary to neutralize 1 gram of the unsaturated polyester. The resulting polyester may be subsequently copolymerized, cross-linked, or cured with "curing amounts" of any of the well-known ethylenically unsaturated monomers used as solvents for the polyester. Examples of such monomers include styrene, alpha-methyl styrene, vinyl toluene, divinyl benzene, chlorostyrene, and the like as well as mixtures thereof. Typically, the mole ratio of such unsaturated monomer to the unsaturated moiety (e.g., maleic acid residue) in the polyester is from about 0.5 to about 3.0, although the "curing amounts" of such monomer can be varied from these ratios.

It is preferred that the unsaturated polyester be prepared from one or more dihydric alcohols, fumaric or maleic acid or mixtures thereof, and up to about 60 mole percent of total acid component of o-phthalic, iso-phthalic or terephthalic acids or mixtures thereof. Preferred for the dihydric alcohol component is one or a mixture of propylene glycol, neopentyl glycol, 2,2,4-trimethyl-1,3-pentanediol, ethylene glycol, or diethylene glycol. A specific preferred unsaturated polyester is prepared from about 75 to 100 mol % propylene glycol, and as the acid component, from about 75 to 100 mol % o-phthalic and maleic acids in a mole ratio of from about ½ to about 2/1. Typical of these unsaturated polyesters are those disclosed, for example, in U.S. Pat. No. 4,359,570 incorporated herein by reference.

The diol components of the linear polyester are selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo-[5.2.1.0]-decane wherein X represents 3, 4, or 5; and diols containing one or more oxygen atoms in the chain e.g., diethylene glycol, triethylene glycol, dipropylene glycol, tripropylene glycol and the like. In general, these diols contain 2 to 18, preferably 2 to 12 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebhacic acid, 1,12-dodecanedioic acid, 2,6-naphthalene-dicarboxylic acid and the like. In the polymer preparation, it is often preferable to use a functional acid derivative thereof such as the dimethyl, diethyl, or dipropyl ester of the dicarboxylic acid. The anhydrides of these acids also can be employed where practical.

The preferred linear copolyesters are especially useful for making blow molded bottles or containers for beverages, and for molded food packages and the like. In this regard, certain of these copolyesters are color, I.V., and heat distortion or "hot fill" stable at temperatures of up to about 100° C., when properly heat set and molded articles therefrom exhibit good thin wall rigidity, excellent clarity and good barrier properties with respect to water and atmospheric gases, particularly carbon dioxide and oxygen.

In regard to products having the "hot fill" stability, the most preferred linear polyesters therefor comprise poly(ethylene terephthalate) and this polymer modified with up to about 5 mol % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, the most preferred polyesters have an I.V. of 0.65 to 0.85, and a Tg of >70° C., and film sections cut from the bottle have a Water Vapor Transmission Rate of 1.5 to 2.5 g. mils/100 in.$^2$–24 hrs., a $CO_2$ Permeability of 20–30 cc. mils/100 in.$^2$–24 hrs.–atm., and an $O_2$ Permeability of 4–8 cc. mils/100 in.$^2$–24 hrs.–atm. The Tg is determined by Differential Scanning Calorimetry at a scan rate of 20 Centigrade Degrees/min., the $O_2$ Permeability by the standard operating procedure of a MOGON OXTRAN 100 instrument of Modern Controls, Inc., of Elk River, Minn., and the $CO_2$ Permeability by the standard operating procedure of a MOCON PERMATRAN C II, also of Modern Controls.

Typical polycarbonates useful herein are disclosed in Kirk-Othmer Encyclopedia of Chemical Technology, third edition, Volume 18, pages 179–494, incorporated herein by reference.

The inherent viscosities (I.V.) of each of the copolyesters herein are determined according to ASTM D2857-70 procedure in a Wagner Viscometer of Lab Glass Inc. of Vineland, N.J. having a ½ ml capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$\{\eta\}^{25°\ C.}_{0.50\%} = \frac{\ln \frac{t_s}{t_o}}{C}$$

where:
$\{\eta\}$ = Inherent viscosity at 25° C. at a polymer concentration of 0.5 g./100 ml. of solvent;
ln = Natural logarithm;
$t_s$ = Sample flow time;
$t_o$ = Solvent-blank flow time; and
C = Concentration of polymer in grams per 100 ml. of solvent = 0.50.

BEST MODES FOR PRACTICING THE INVENTION

EXAMPLE 1

Terephthalaldehyde (2.68 g, 0.02 m), methyl cyanoacetate (4.0 g, 0.04 m), methanol (50 ml), and piperidine acetate (0.5 g) are mixed and heated at reflux for one hour. The reaction mixture is cooled and the solid product is collected by filtration, washed with methanol, and dried in air. The product, dimethyl 3,3'-(1,4-phenylene)-bis-[2-cyano-2-propenoate], weighs 2.2 g and has a maximum in the UV absorption spectrum in acetone at 345 nm with an extinction coefficient ($\epsilon$) of 36,704.

EXAMPLE 2

A mixture of terephthalaldehyde (0.67 g, 0.005 mol), methyl 4-(cyanomethyl)benzoate, ethanol (15 mL), piperidine (10 drops) and acetic acid (5 drops) is heated at reflux for four hours. The reaction mixture is cooled to precipitate the product which is collected by filtration, washed with ethanol and dried in air. The yield of product is 1.1 g. Mass spectroscopy confirms the product is the expected 3,3'-(1,4-phenylene)bis-[2-(4-methoxycarbonyl)phenyl-2-propenenitrile] having the structure:

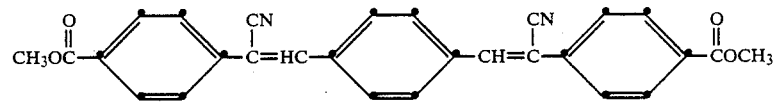

EXAMPLE 3

A mixture of terephthalaldehyde (1.34 g, 0.01 mol), ethyl 2-(α-benzoxazolyl)acetate (4.10 g, 0.02 mol), ethanol (20 ml), piperidine (10 drops) and acetic acid (5 drops) is heated at reflux for three hours. The product crystallizes during the period of heating and is collected by filtration of the hot reaction mixture. The product obtained is washed with ethanol and dried in air to yield 3.5 g of product which analyses confirmed is diethyl 3,3'-(1,4-phenylene)bis-[2-(2-benzoxazolyl)2-propenoate] having the structure:

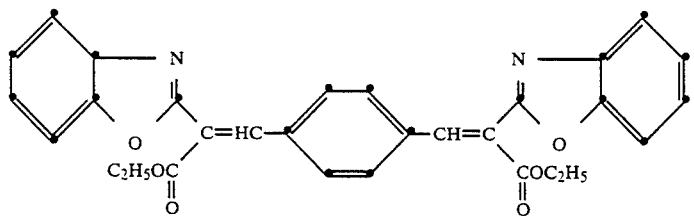

Additional examples of bis-methine compounds which may be used in the preparation of our novel polymer compositions are set forth in the following tables. These compounds may be prepared according to the procedures described in the preceding examples and conform to the generic formulas given for each table.

TABLE I $$NC-\underset{R^1}{\overset{|}{C}}-HC=\underset{R^7}{\underset{|}{\bigcirc}}=CH=\underset{R^1}{\overset{|}{C}}-CN$$

| Ex. | $R^1$ | $R^7$ |
|---|---|---|
| 4 | —COOC$_2$H$_5$ | H |
| 5 | —COOCH(CH$_3$)$_2$ | H |
| 6 | —COOCH$_2$CH(CH$_3$)C$_2$H$_5$ | H |
| 7 | —COOCH$_2$CH$_2$CH(CH$_3$)$_2$ | H |
| 8 | —COOC(CH$_3$)$_3$ | H |
| 9 | —COOCH$_2$C$_6$H$_{11}$ | H |
| 10 | —COOC$_6$H$_4$-4-CH$_3$ | H |
| 11 | —COOC$_6$H$_{11}$ | H |
| 12 | —COOC$_5$H$_9$ | H |
| 13 | —COOCH$_2$C≡CHCH=CHO | H |
| 14 | —COOCH$_2$CH(CH$_2$)$_3$O | H |
| 15 | —COOCH$_2$C$_6$H$_5$ | H |
| 16 | —COOCH$_2$CH$_2$OH | H |
| 17 | —COOCH$_2$CH$_2$Cl | H |
| 18 | —COOCH$_2$CH$_2$OC$_2$H$_5$ | H |
| 19 | —COOCH$_2$CH$_2$OC$_6$H$_5$ | H |
| 20 | —COOC$_6$H$_5$ | H |
| 21 | —COOCH$_2$C$_6$H$_{10}$-4-CH$_2$OH | H |
| 22 | —COO(CH$_2$)$_5$CH$_3$ | H |
| 23 | —COOCH$_3$ | 2-CH$_3$ |
| 24 | —COOCH$_3$ | 2-Cl |
| 25 | —COOCH$_3$ | 2,5-di-CH$_3$ |
| 26 | —COOCH$_3$ | 2-F |
| 27 | —COOCH$_3$ | 2,3-di-Cl |
| 28 | —COOCH$_3$ | 2,5-di-Cl |
| 29 | —COOCH$_3$ | 2,3,5,6-tetra-CH$_3$ |
| 30 | —COOCH$_2$CH$_2$COOC$_2$H$_5$ | H |
| 31 | —COOCH$_2$CH$_2$NHCOCH$_3$ | H |
| 32 | —COOCH$_2$CH$_2$OOCCH$_3$ | H |
| 33 | —COOCH$_2$CH(OH)CH$_2$OH | H |
| 34 | —COOC$_6$H$_{10}$-4-C$_2$H$_5$ | H |
| 35 | —COOCH$_2$CH=CH$_2$ | H |
| 36 | —C$_6$H$_4$-4-COOCH$_3$ | H |
| 37 | —C=N-o-C$_6$H$_3$—(5-COOCH$_3$)—O | H |
| 38 | —C=N-o-C$_6$H$_3$—(5-COOC$_2$H$_5$)—S | H |
| 39 | —C=N-o-C$_6$H$_3$—(5-COOCH$_3$)—NH | H |
| 40 | —CONHCH$_2$CH$_2$OH | H |
| 41 | —SO$_2$C$_6$H$_4$-4-CH$_2$CH$_2$OH | H |
| 42 | —CONHC$_6$H$_3$-2-OCH$_3$-5-SO$_2$NHCH$_2$CH$_2$OH | H |

TABLE I-continued

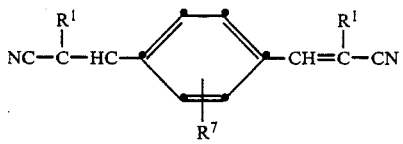

| Ex. | R¹ | R⁷ |
|---|---|---|
| 43 | —COC₆H₄-3-COOCH₃ | H |
| 44 | —C=N—C(CH₃)=C(COOC₂H₅)—S (cyclic) | H |
| 45 | —C=CHCH=C(COOC₂H₅)—S (cyclic) | H |
| 46 | —C=NN=C(COOH)—O (cyclic) | H |
| 47 | —SO₂CH₂CH₂OCH₂CH₂OH | H |
| 48 | —CONHCH₂C₆H₁₀-4-CH₂OH | H |
| 49 | —CONHCH₂CH₂C₆H₄-4-COOCH₃ | H |
| 50 | —CONHCH₂CH₂SCH₂CH₂OH | H |
| 51 | —CONHCH₂CH₂OOCCH₃ | H |
| 52 | —SO₂CH₂CH₂OOCOC₂H₅ | H |
| 53 | —CONHCH₂C₆H₄-4-COOH | H |
| 54 | —C₆H₄-4-COCl | H |
| 55 | —C=N-o-C₆H₃—(5-SO₂NHCH₂CH₂OH)—O (cyclic) | H |
| 56 | —C=NC(CH₃)=C(SO₂NHC₆H₄COOCH₃)—S (cyclic) | H |
| 57 | —COC₆H₃-3-COOH-4-OCH₃ | H |
| 58 | —C₆H₄-4-CONH(CH₂CH₂O)₂H | 2-CH₃ |
| 59 | —CON(CH₃)CH₂CH₂OH | 2-Cl |

TABLE II

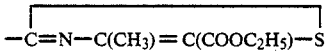

| Ex. | R² | R³ | R⁷ |
|---|---|---|---|
| 60 | —COC₆H₅ | —C₂H₅ | H |
| 61 | —C=N-o-C₆H₄—O (cyclic) | —C₂H₅ | H |
| 62 | —C=N-o-C₆H₃—(6-CH₃)—S (cyclic) | —CH₃ | H |
| 63 | —C=N-o-C₆H₄—NH (cyclic) | —CH₂CH₂CH₃ | H |
| 64 | —C₆H₄-4-CN | —CH₂CH₂Cl | H |
| 65 | —C=NCH(C₆H₅)=CS (cyclic) | —CH₂CH=CH₂ | H |
| 66 | —C=N-o-C₆H₃—(5-COOCH₃)—O (cyclic) | —CH₂C₆H₁₀CH₂OH | H |
| 67 | —C=CHCH=C(CH₃)S (cyclic) | —CH₂C₆H₅ | H |

TABLE II-continued $$R^3-OC(=O)-C(R^2)=HC-\underset{R^7}{\underset{|}{\text{C}_6\text{H}_3}}-CH=C(R^2)-CO-R^3$$

| Ex. | R² | R³ | R⁷ |
|---|---|---|---|
| 68 | —C=NH=C(C₆H₅)S | —CH₂CH₂OC₆H₅ | H |
| 69 | —C=NN=CHO | —CH₂C₆H₁₁ | H |
| 70 | —C=N-o-C₆H₃—[6-SO₂N(CH₃)₂]—O | —(CH₂CH₂O)₂H | H |
| 71 | —C₆H₄-4-SO₂NHCH₃ | —CH₂CH(CH₃)₂ | H |
| 72 | —C₆H₄-4-SO₂CH₃ | H | H |
| 73 | —COC₆H₄-4-OCH₃ | —C₂H₅ | 2,5-di-CH₃ |
| 74 | —COC₆H₃-3,4-di-Cl | —C₂H₅ | 2,5-di-Cl |
| 75 | —C=CHCH=C[SO₂N(CH₃)₂]S | —CH₃ | 2-CH₃ |
| 76 | —C₆H₃-3-SO₂NHCH₂CH₂OH-4-OCH₃ | —CH₂CH₂SCH₂CH₂OH | H |
| 77 | —COC₆H₄-4-COOCH₃ | —C₂H₅ | H |
| 78 | —C=N-o-C₆H₄N—CH₃ | —C₂H₅ | H |
| 79 | —C=NN=C(C₆H₅)S | —C₂H₅ | H |
| 80 | —COC₆H₄-4-C₂H₅ | —C₂H₅ | H |

EXAMPLE 81

The following compounds are placed in a 500 ml, three-necked, round-bottom flask:
97 g (0.5 mol) dimethyl terephthalate;
62 g (1.0 mol) ethylene glycol;
0.064 ml of a n-butanol solution of acetyl-triisopropyl titanate which contains 0.00192 g Ti;
1.1 ml of an ethylene glycol solution of Mn(O-COCH₃)₂·4H₂O which contains 0.0053 g Mn;
2.3 ml of an ethylene glycol solution of Sb(OCOCH₃)₃ which contains 0.0216 g Sb; and
0.64 ml of an ethylene glycol solution of Co(O-COCH₃)₂·4H₂O which contains 0.0072 g Co.

The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then 1.57 ml of an ethylene glycol slurry of Zonyl A which contains 0.012 g phosphorus is added. The temperature of the bath is increased to 230° C. At 230° C., 0.0384 g dimethyl 3,3'-(1,4-phenylene)bis-[2-cyanopropenoate] are added to the flask. Five minutes after this addition, a vacuum with a slow stream of nitrogen bleeding into the system is applied over a five-minute period until the pressure is reduced to 200 mm Hg. The flask and contents are heated at 230° C. under a pressure of 200 mm Hg for 25 minutes. The metal bath temperature is increased to 270° C. At 270° C. the pressure is reduced slowly to 100 mm Hg. The flask and contents are heated at 270° C. under a pressure of 100 mm Hg for 30 minutes. The metal bath temperature is then increased to 285° C. and the pressure is reduced slowly to 4.5 mm Hg. The flask and contents are heated to 285° C. under pressure of 4.5 mm Hg for 25 minutes and the pressure then reduced to 0.25 mm Hg and polycondensation continued for 40 minutes. The flask is removed from the metal bath and allowed to cool in nitrogen atmosphere while the polymer crystallizes. The resulting polymer has an inherent viscosity of 0.54 measured in a 60/40 ratio by weight of phenol/tetrachloroethane at a concentration of 0.5 g per 100 ml. An amorphous 13-mil thick film molded from this polymer to simulate the sidewall of a container transmits less than 10% light from 250 to 370 nm whereas a 13-mil film prepared from a like polyester without the copolymerized absorber transmits greater than 10% light at all wavelengths above 320 nm.

EXAMPLE 82

The procedure described in Example 81 is repeated using 0.0384 g of 3,3'-(1,4-phenylene)bis-[2-(4-methoxycarbonyl)phenyl-2-propenenitrile] prepared according to the procedure described in Example 2 instead of the bis-methine compound used in Example 81. The resulting polymer has an inherent viscosity of 0.51 measured in a 60/40 ratio by weight of phenol/tetrachloroethane at a concentration of 0.5 g per 100 mL. An amorphous 15-mil thick film molded from this polyester shows a strong absorption peak with a maximum at 374 nm.

EXAMPLE 83

The procedure described in Example 81 is repeated using 0.0384 g of diethyl 3,3'-(1,4-phenylene)bis-[2- (2-benzoaxazolyl)-2-propenoate] prepared in Example 3 rather than the bis-methine compound used in Example 81. The resulting polymer has an inherent viscosity of 0.53 measured in a 60/40 ratio by weight of phenol/tetrachloroethane at a concentration of 0.5 g per 100 mL. An amorphous 13-mil thick film molded from this polyester exhibits a strong absorption peak with a maximum at 371 nm.

EXAMPLE 84

The procedure described in Example 81 is repeated using 0.0384 g of diethyl 3,3'-(1,4-phenylene)bis-[2-benzoyl-2-propenoate] of Example 60 instead of the bis-methine absorber used in Example 81. The resulting polymer has an inherent viscosity of 0.50 measured in a 60/40 ratio by weight of phenol/tetrachloroethane at a concentration of 0.5 g per 100 mL. An amorphous 13-mil thick film molded from this polyester exhibits a strong absorption peak with a maximum at 350 nm.

While the invention has been described in detail with particular reference to preferred embodiments thereof, it will be understood that variations and modifications can be effected within the spirit and scope of the invention.

We claim:

1. A composition comprising molding or fiber grade condensation polymer having copolymerized therein a total of from 1.0 to 10,000 ppm, of the reactant residue moieties of one or a mixture of bis-methine reactants of the formula $$M^1=HC-Ar^1-CH=M^2$$

wherein $Ar^1$ is an unsubstituted or substituted 1,4-phenylene radical; and $M^1$ and $M^2$ are the same or different and each is a disubstituted methylene group having the structure

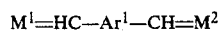

wherein $R^1$ is

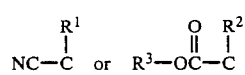

and $R^2$ is

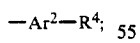

wherein $R^3$ is hydrogen, allyl or an unsubstituted or substituted alkyl, cycloalkyl or phenyl radical;

$X$ is a divalent alkylene, cycloalkylene or phenylene radical or a combination thereof which may contain within the divalent chain one or two atoms or radicals selected from

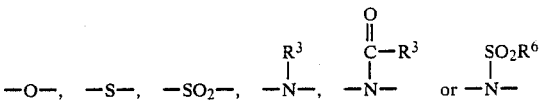

wherein $R^6$ is an unsubstituted or substituted alkyl, cycloalkyl or phenyl radical;

$R^4$ is a group that is reactive with one of the monomers from which the condensation polymer is prepared;

$Ar^2$ is an unsubstituted or substituted phenylene or heterocyclic arylene radical; and $R^5$ is hydrogen, $R^4$ or $-X-R^4$; wherein the bis-methine moiety absorbs radiation significantly in the range of 250 to 390 nm and is non-extractable from said polymer and is stable under the conditions the polymer is prepared or processed.

2. The composition of claim 1 wherein the total amount of bis-methine moiety present is from about 2.0 to about 1500 ppm.

3. The composition of claim 1 wherein the total bis-methine moiety present is from about 100 to about 800 ppm.

4. The composition of claim 1 wherein the polymer is a linear polyester and the bis-methine compound has the formula

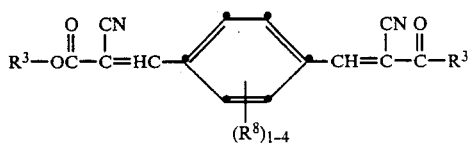

wherein $R^3$ is defined above and $R^8$ is hydrogen, alkyl or halogen.

5. The composition of claim 4 wherein the polymer is poly(ethylene terephthalate) or poly(ethylene terephthalate)modified with up to 5 mole percent of 1,4-cyclohexanedimethanol, $R^3$ is alkyl of 1 to 6 carbon atoms and $R^8$ is hydrogen.

6. A composition of claim 1 wherein the polymer is a linear polyester and the bis-methine compound has the formula

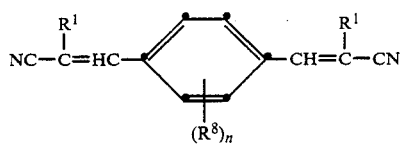

wherein $R^1$ is lower alkoxycarbonylphenyl, lower alkoxycarbonylbenzoyl, lower alkoxycarbonyl-2-benzoxazolyl, lower alkoxycarbonyl-2-benzothiazolyl, lower alkoxycarbonyl-2-benzimidazolyl, N-lower hydroxyalkylcarbamoyl or N-lower alkanoyloxy-lower-alkylcarbamoyl;

$R^8$ is lower alkyl, halogen or hydrogen; and $n$ is 1 or 2.

7. A composition of claim 6 wherein the polymer is poly(ethylene terephthalate) or poly(ethylene terephthalate) modified with up to 5 mole percent of 1,4-cyclohexanedimethanol and $R^8$ is hydrogen.

8. A composition of claim 1 wherein the polymer is a linear polyester and the bis-methine compound has the formula

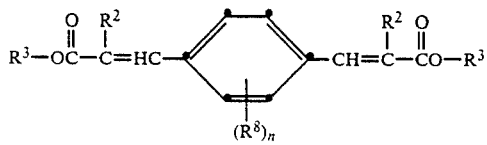

wherein
R$^3$ is lower alkyl;
R$^2$ is benzoyl, 2-benzoxaxolyl, 2-benzothiazolyl or 2-benzimidazolyl;
R$^8$ is lower alkyl, halogen or hydrogen; and
n is 1 or 2.

9. A composition of claim 8 wherein the polymer is poly(ethylene terephthalate) or poly(ethylene terephthalate) modified with up to 5 mole percent 1,4-cyclohexanedimethanol and R$^8$ is hydrogen.

10. The composition of any of claims 4, 6 or 8 wherein the polyester is comprised of from about 75 to 100 mol % terephthalic acid residue and from about 75 to 100 mol % ethylene glycol residue and the polyester contains a total of 100 to 800 ppm of one or a mixture of the bis-methine moieties.

11. The composition of claim 1 wherein the polymer is unsaturated polyester having an acid moiety comprised of fumaric or maleic acid or mixtures thereof and up to about 60 mol % of one or a mixture of o-phthalic, iso-phthalic, or terephthalic acids, and having a glycol moiety comprised of one or a mixture of propylene glycol, neopentyl glycol, 2,2,4-trimethyl-1,3-pentanediol, ethylene glycol or diethylene glycol.

12. The composition of claim 10 wherein the acid moiety is comprised of from about 75 to 100 mol % o-phthalic acid and maleic acid in a mole ratio of from about ½ to about 2/1, and the glycol moiety is comprised of from about 75 to 100 mol % propylene glycol.

13. The composition of claim 11 containing a curing amount of an ethylenically unsaturated monomer.

14. A cured, formed article of the composition of claim 13.

15. A fiber of the composition of claim 1 dyed with from about 0.01 to about 5.0% by weight based on weight of fiber of a disperse dye.

16. A formed article of the composition of claim 1.
17. A formed article of the composition of claim 4.
18. A formed article of the composition of claim 6.
19. A formed article of the composition of claim 8.

* * * * *